April 4, 1967     A. R. ERBACH     3,312,980
RECTILINEAR RECORDER
Filed Aug. 16, 1965

ARTHUR R. ERBACH
*INVENTOR.*

BY *A. M. Fernandez*

ATTORNEY

3,312,980
RECTILINEAR RECORDER
Arthur R. Erbach, Des Plaines, Ill., assignor to Beckman Instruments, Inc., a corporation of California
Filed Aug. 16, 1965, Ser. No. 479,864
10 Claims. (Cl. 346—139)

This invention relates to a mechanism for converting limited angular motion to straight line motion and more particularly to a linkage mechanism for converting limited angular motion of a drive shaft to proportional straight line motion of a stylus for recording.

In direct writing oscillographic recorders, it is often desirable to record limited angular motion as a straight line on rectilinear coordinates. Many mechanisms have been devised in the past to convert angular motion to straight line motion for recorders as well as other output display devices. Most of these mechanisms are based on the elliptic trammel which employs a floating link or arm. One end of the floating arm carries the stylus or indicator that is to move along a straight line. The other end of the floating arm is constrained to move in a straight line perpendicular to the desired path of the stylus or indicator. A drive crank is provided with one end pivotally connected to the intersection between the desired path of the indicator and the straight line to which the other end of the floating arm is constrained. The other end of the drive crank is pivotally connected midway between the two ends of the floating arm. Although the motion of the indicator or stylus of such a basic elliptic trammel is in a straight line, the amplitude of the excursion is a nonlinear function of the input angle or angular motion of the drive shaft to which the control crank is connected.

In a mechanism for converting limited rotary motion to straight line motion, it is also highly desirable that the linear motion of the stylus or indicator be proportional to the angular motion of the drive shaft. For many applications, the linearity error of the basic elliptic trammel mechanisms is too large. Moreover, such a basic mechanism is difficult to use in recorders because the straight line path of the stylus passes over the pivot point of the drive crank.

An object of the present invention is to provide an improved system for converting limited angular motion to proportional straight line motion.

A further object of the present invention is to provide a rectilinear recording system which converts limited angular motion to proportional straight line motion.

Another object is to provide a rectilinear oscillographic recording system which facilitates placing a record medium in the path of the recording stylus.

Still another object of the present invention is to provide a rectilinear oscillographic recording system which facilitates connecting a rotating drive shafts of a measuring system directly to a drive crank of the recording system.

In a preferred embodiment of this invention, a floating arm of a suitable length is selected, the exact length depending upon how far in front of the control mechanism the straight line recording path is desired. A block having a guiding slot is placed at the rear of the mechanism to constrain the rear end of the floating arm to move in a straight line perpendicular to the recording path. The length of the guide slot is selected to be just sufficient for the controlled motion of the floating arm in response to a limited angular motion of an input drive shaft. A control link is connected between the floating arm and a pivot point on the center line of the guide slot. The control link is connected to the floating arm at about its mid-point, but closer to the stylus in order to allow for the connection of a drive crank between the floating arm and a drive shaft which is located on the center line of the guide slot and as close to the guide block as possible. The outer end of the guide crank is connected to the floating arm by a drive pin inserted in a slot provided along the center of the floating arm. In that manner the floating arm is driven in both directions by the drive crank in response to angular motion of the drive shaft. The use of a separate drive crank reduces the linearity error present in other similar mechanisms which employ the control link as a drive crank and placing the drive crank toward the rear of the mechanism facilitates connecting it directly to a drive shaft. It also facilitates placing a record medium in the recording path.

Other objects and advantages of the present invention will become apparent from the following detailed description of the invention with reference to the drawings in which.

Figure 1:
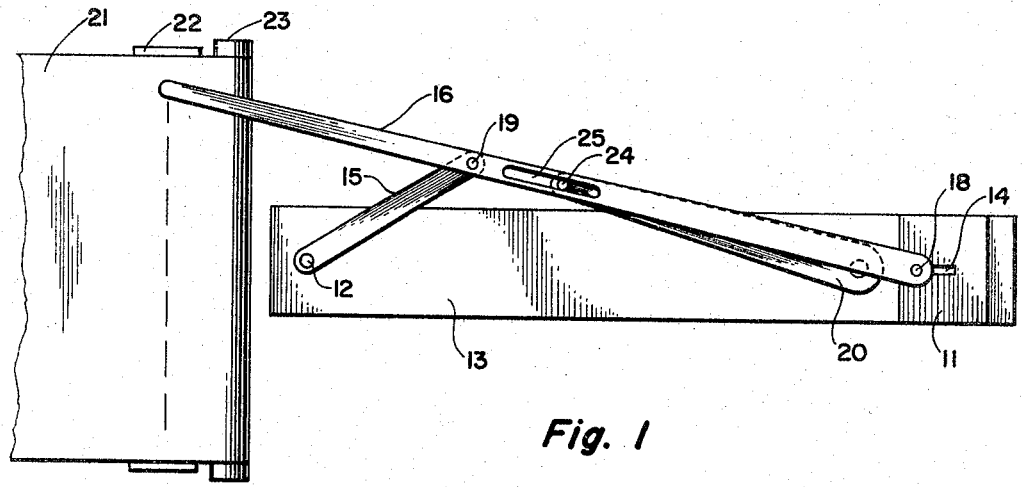
FIG. 1 is a plan view of a linkage mechanism which embodies the invention.
Figure 2:
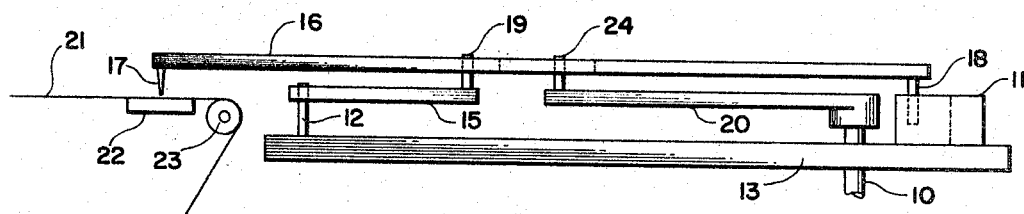
FIG. 2 is a side view of the embodiment of FIG. 1.

Referring now to the drawings, FIGURES 1 and 2 illustrate a linkage mechanism for converting limited rotary motion to straight line motion. The usual drive source for the mechanism is an element having some limited angular motion. This mechanism converts that limited angular motion to proportional linear motion. It is to be understood that the drive source is connected to a drive shaft 10.

In its basic form, the mechanism consists of a guide block 11 and a pivot pin 12 fixedly connected to a common base 13 such that the center of the pivot pin 12 lies on the center line of a guide slot 14 in the block 11. A control link 15 is mounted to pivot about the pin 12 as a floating arm 16 is driven to cause an indicator or stylus 17 (FIG. 2 only) at one end to move in a straight line path.

While the stylus is moving in a straight line, the floating arm rotates as it moves in a direction away from the center position due to a guide pin 18, which constrains the rear end of the floating arm to move in a line perpendicular to the straight line path of the stylus, and the control link 15 the free end of which is connected to the floating arm through a control pin 19.

The straight line motion of the stylus 17 is established by the cooperation of the control link 15 and the floating arm 16 in conjunction with the guide pin 18 in the guide slot 14 as in the basic elliptical trammel, but with link proportions modified not only to place the stylus 17 in front of the pivot point 12 a distance A, but also to place a drive crank 20 toward the rear of the mechanism. As the floating arm is driven by the rotary motion of the drive crank 20, the control link 15 rotates about the pin 12. As the control link 15 rotates counterclockwise from the position shown in FIG. 1, the floating arm is moved back toward the guide block 11. Since the guide pin 18 is constrained to slide in the slot 14, the path of the stylus 17 will be substantially straight and perpendicular to the center line of the guide slot 11.

A study of the equations for the proportions of a basic elliptical trammel mechanism will show that a perfectly straight line is traversed by the stylus when the floating arm 16 is twice the length of the control link 15 and the control pin 19 is pivotally connected to the center of the floating arm 16. However, such a basic elliptical trammel would cause the stylus 17 to traverse directly over the pivot pin 12. Under those conditions it would be quite difficult to provide a suitable arrangement for placing the record medium in the straight line path of the stylus 17. It is desirable to use a shorter control link 15 as shown in FIG. 1 in order that a record medium 21 may be placed in the straight line path of the stylus 17, particularly when the record medium 21 is to be moved over a platen 22 while recording. In that manner, even a paper roller 23 (FIG. 2) may be provided to guide the paper 21 over the platen 22.

In order that the stylus 17 will move in a path which approximates a straight line within the accuracy required for recording, which is with an error less than one-fourth to one-third the width of the recording line, the following formulas should be applied in determining proportions.

$$A = B - (C+D) \qquad (1)$$

$$C = \frac{Y^2}{2A(1-\cos\theta) + 2Y\sin\theta} \qquad (2)$$

$$D = \frac{\sin\theta\ (C^2 + AC)}{Y - C\sin\theta} \qquad (3)$$

In these equations, A is the distance from the straight line path of the stylus 17 to the center of the control pivot pin 12; B is the total length of the floating arm from the center of the stylus 17 to the center of the guide pin 18; C is the length of the control link 15 from the center of the pivot pin 12 to the center of the control pin 19; D is the distance between the center of the control pin 19 and the center of the guide pin 18; Y is the required maximum deflection of the stylus 17 from its center position; and $\theta$ is the angle of maximum deflection of the control link 14 from its center position.

As noted hereinbefore, true rectilinear motion of the stylus 17 for a perfectly straight recording path will occur when C is equal to D, and D is equal to ½ B. Under that set of conditions, A is equal to zero and the excursion Y of the stylus 17 is defined by the following equation:

$$Y = B\sin\theta = B\sin\phi \qquad (4)$$

where $\phi$ is the angle of deflection of the floating arm 16 from its centered position. Since the dimensions C and D are equal, the angles $\phi$ and $\theta$ will also be equal and the excursion Y will be a nonlinear function of either angle.

From the foregoing it may be seen that these conditions for producing a perfectly straight line are not the most desirable because the deflection Y is not a linear function of the input angle $\theta$ and the arrangement makes it difficult to place a record medium under the stylus 17.

If the foregoing equations which define the proportions for the dimensions B, C and D for a selected dimension A are used to provide the least rectilinear error in a mechanism as shown in FIG. 1, D will be greater than C and the angle $\theta$ will at all times be greater than the angle $\phi$. The excursion Y is then defined by the following equation.

$$Y = B\sin\phi = \frac{BC}{D}\sin\theta \qquad (5)$$

From that equation it may be seen that the linearity of the conversion from angular motion to straight line motion still varies as a function of the sine of the angle $\phi$. However, for a given excursion Y, the angle $\phi$ is less than the angle $\theta$ so that the linearity error will be less if the reference or input angle is the angle $\phi$ between the floating arm 16 and the center line of the guide slot 14, instead of the angle $\theta$ between the control link 15 and the center line of the guide slot 14.

In order that the actual reference or input angle $\psi$ approximate as closely as possible the angle $\phi$ between the floating arm 16 and the center line of the guiding slot 14, the drive crank 20, which translates the input angle $\psi$ to the floating arm 16, is made as long as possible and placed with its driven end as close to the constrained end of the floating arm 16 as possible. This is accomplished by placing the drive shaft 10 as close to the guide block 11 as possible, and by using a pin 24 slot 25 combination to transmit the angular motion of the drive crank 20 to the floating arm 19. In that manner the guide pin 18 of the floating arm 16 is moved in a line perpendicular to the straight line path of the stylus 17.

In summary, to approximate the use of angle $\phi$ for the reference angle, the drive crank pivot (drive shaft 10) should be placed on the center line of the guide slot 14 and as far back toward the guide block 11 as possible without interfering with the forward motion of the guide pin 18 in the guide slot 14 for the maximum deflection Y required and the length of the drive crank 20 should be as long as possible without interfering with the control link 15 when the floating arm 16 is in its centered position. In that manner the actual reference angle $\psi$ of the drive crank will more closely approximate the reference angle $\phi$ of the floating arm 16. Since the reference angle $\psi$ is much less than the control-link angle $\theta$ for any given stylus excursion Y, the linearity error is reduced even though the drive shaft 10 cannot be connected directly to the guide pin 18. Thus, with a separate drive crank, the equation for the excursion Y is:

$$Y = B\sin\theta = E\sin\psi + (F - E\cos\psi)\tan\phi \qquad (6)$$

The angles $\phi$ and $\psi$ are related by the equation:

$$\frac{B\sin\theta}{E\sin\psi} = 1 + \frac{F}{E\sin\psi} - \frac{E\tan\theta}{\tan\psi} \qquad (7)$$

E is the length of the drive crank from the center of the drive shaft 10 to the center of the drive pin 24 and F is the distance from the center of the drive shaft 10 to the center of the stylus 17 when the floating arm 16 is in its centered position.

Figure 3:
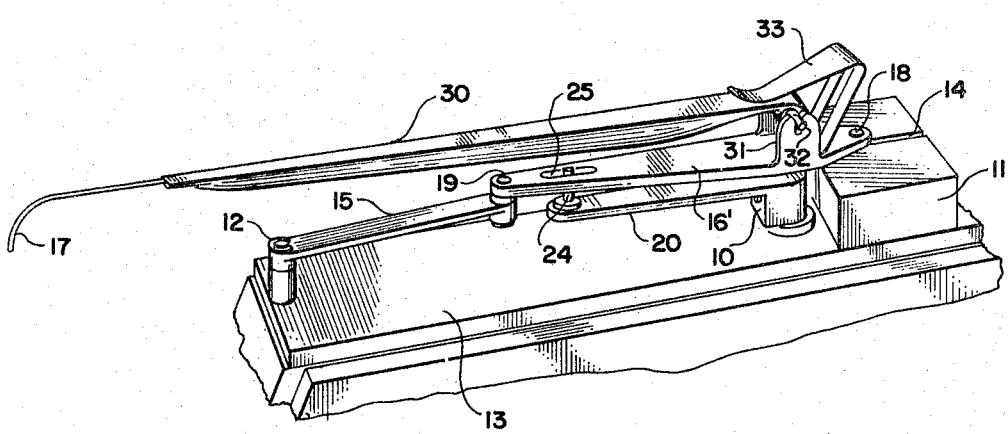
FIG. 3 is a perspective view of a preferred embodiment of the invention.

In the first embodiment of FIGS. 1 and 2, the floating arm has been illustrated as one straight-line member from the stylus 17 to the guide pin 18. However, it is preferable to construct the floating arm 15 in two parts, one from the guide pin 18 to the control pin 19 and the second from a carriage on the first to the stylus as shown in FIG. 3. The first member is identified by the reference numeral 16' since it corresponds to the floating arm 16 of the first embodiment. The second is a recording arm 30 mounted in a cradle 31 to swivel about trunnions 32 having their axis parallel to the base 13 and perpendicular to the center line of the floating arm 16'. A spring 33 biases the recording arm 30 to provide the desired pressure at the stylus 17 against a record medium.

Although the present invention has been shown and described with reference to particular embodiments, it should be apparent to one skilled in the art that many changes and modifications may be made without departing from the spirit and scope of the present invention.

I claim as my invention:

1. A linkage mechanism for converting limited angular motion of a drive shaft to straight line motion comprising
    a block having a guide slot for receiving a guide pin and constraining it to motion in a straight line within said slot,
    an arm having one end free to move along a substantially straight line path in response to angular motion of said drive shaft, and having the other end thereof connected to said guide pin,
    a control link having one end pivotally connected to said arm and the other end mounted to pivot about a stationary control pin positioned on the center line of said guide slot and between said guide block and said straight line path,
    a drive crank connected to said guide shaft, said drive shaft being mounted to rotate about a fixed point on the center line of said guide slot, said fixed point being positioned between said guide block and said control pin,
    and a connection between the outer end of said drive crank and said arm for driving said arm, thereby converting limited angular motion of said drive shaft to substantially straight line motion of the free end of said arm.

2. A linkage mechanism as defined in claim 1 wherein the distance between said guide pin at one end of said arm and the point at which said control link is pivotally connected to said arm is greater than the length of said control link.

3. A linkage mechanism as defined in claim 2 wherein the fixed point about which said drive crank is mounted to rotate is positioned as far away from said control link as possible without interfering with motion of said guide pin in a line perpendicular to said straight line path.

4. A linkage mechanism as defined in claim 3 wherein the length of said drive crank from its pivot point to its outer end is made as long as possible without causing interference with said control link as said arm is driven through a position with its center line perpendicular to said straight line path.

5. A linkage mechanism for converting limited angular motion of a drive shaft to straight line motion comprising
an arm having a free end to be moved along a substantially straight line path in response to angular motion of said drive shaft,
means for constraining the other end of said arm to move in a line perpendicular to said straight line path,
a control link having one end pivotally connected to said arm and the other end mounted to pivot about a stationary control pin on said line perpendicular to said straight line path,
a drive crank connected to said drive shaft, said drive shaft being mounted to rotate about a fixed point on said line perpendicular to said straight line path and having a drive pin at its outer end for driving said arm through a pin and slot connection,
and a drive slot in said arm for said pin and slot connection, said slot constraining said drive pin to move relative to said floating arm along the center line thereof.

6. A linkage mechanism as defined in claim 5 wherein the distance between said guide pin at one end of said arm and the point at which said control link is pivotally connected to said arm is greater than the length of the control link.

7. A linkage mechanism as defined in claim 6 wherein the fixed point about which said drive crank is mounted to rotate is positioned as far away from said control link as possible without interfering with said means for constraining said other end of said arm to move in a line perpendicular to said straight line path.

8. A linkage mechanism as defined in claim 7 wherein the length of said drive crank from its pivot point to the center of said drive pin is made as long as possible without causing interference with said control link as said arm is driven through a position with its center line perpendicular to said straight line path.

9. A linkage mechanism for converting limited angular motion of a drive shaft to straight line motion for recording comprising
an arm having a sylus at one end for recording along a substantially straight line path, and having a guide pin at the other end,
a guide slot for receiving said guide pin and constraining it to motion in a straight line perpendicular to said straight line path,
a control link having one end pivotally connected to said arm and the other end mounted to pivot about a stationary control pin positioned on the center line of said guide slot and between said guide slot and said straight line path,
a drive crank connected to said drive shaft, said drive shaft being mounted to rotate about a fixed point on the center line of said guide slot and between said guide slot and said control,
and a sliding connection of the outer end of said drive crank with said arm.

10. A linkage mechanism for converting limited angular motion of a drive shaft to straight line motion for recording comprising
a floating arm of a suitable length depending upon how far in front of said mechanism a straight line recording path is desired, said arm having a recording stylus at one end and a guide pin at the other,
a block having a guiding slot for receiving said guide pin, said block being placed at the rear of said mechanism for constraining the rear end of the floating arm to move in a straight line perpendicular to said recording path, the length of the guiding slot being selected to be sufficient for the controlled motion of the floating arm in response to a limited angular motion of said drive shaft,
a control link connected between the floating arm and a pivot point on the center line of the guide slot, said pivot point being placed between said block and said recording path, and said control link being connected to the floating arm at about its mid point, but closer to the recording end thereof,
a drive crank connected between the floating arm and said drive shaft, said drive shaft being fixedly located at a point on the center line of said guiding slot and as close to said clock as possible, the outer end of the guiding crank being slidably connected to the floating arm.

No references cited.

RICHARD B. WILKINSON, *Primary Examiner.*

M. LORCH, *Assistant Examiner.*